United States Patent [19]

Dunphy

[11] Patent Number: 4,851,473
[45] Date of Patent: Jul. 25, 1989

[54] HIGH IMPACT RESISTANT POLYAMIDE

[75] Inventor: James F. Dunphy, Parkersberg, W. Va.

[73] Assignee: E. I. Du Pont de Nemours and Company, Wilmington, Del.

[21] Appl. No.: 144,095

[22] Filed: Jan. 15, 1988

Related U.S. Application Data

[63] Continuation of Ser. No. 716,692, Mar. 27, 1985, abandoned, which is a continuation-in-part of Ser. No. 691,575, Jan. 15, 1985, abandoned.

[51] Int. Cl.$^4$ .............................................. C08L 77/00
[52] U.S. Cl. ...................... 525/66; 525/179; 525/183
[58] Field of Search .......................... 525/183, 66, 179

[56] References Cited

U.S. PATENT DOCUMENTS 3,264,272 8/1966 Rees ..................................... 428/523
4,174,358 11/1979 Epstein ............................... 525/183
4,410,661 10/1983 Epstein .................................. 525/66

Primary Examiner—John C. Bleutge
Assistant Examiner—A. Carrillo
Attorney, Agent, or Firm—Frank C. Hilberg, Jr.

[57] ABSTRACT

High impact resistant polyamide resins containing a polyamide matrix comprising at least one amorphous polyamide and dispersed particles of a toughener formed of a blend of ethylene, propylene, diene monomer rubber containing grafted succinic anhydride groups and an ionomer derived from ethylene, an alkyl acrylate and acrylic acid or methacrylic acid. The toughener has a particle size of less than about 360 nm, as determined by a small angle x-ray scattering technique. The toughener is present in the resin in the amount of at least 15% by weight.

7 Claims, No Drawings

HIGH IMPACT RESISTANT POLYAMIDE

CROSS-REFERENCE TO RELATED APPLICATION

This application is a continuation of U.S. Ser. No. 716,692, filed Mar. 27, 1985 now abandoned, which is a continuation-in-part of U.S. Ser. No. 691,575, filed Jan. 15, 1985, now abandoned.

FIELD OF THE INVENTION

This invention relates to polyamide resins that have high impact resistance at low temperatures. More particularly, this invention relates to amorphous polyamides that contain at least a particular amount of dispersed toughener particles of two particular groups of chemical compositions and have a particle size of less than about 360 nm as determined by the small angle X-ray scattering technique disclosed.

BACKGROUND

Toughened nylon compositions are commercial high volume products. Such compositions contain a continuous nylon phase and a dispersed toughener phase. Such compositions are disclosed in Epstein, U.S. Pat. No. 4,174,358 dated Nov. 13, 1979.

The present invention is an improvement over the compositions disclosed in the Epstein patent, in that it has been found that certain amorphous nylons, when toughened with a combination of certain specific tougheners, in certain specific amounts, and the tougheners exist in the amorphous nylon as particles having a particle size of less than about 360 nm, yield fabricated parts having higher impact resistance at room temperature than those previously known.

SUMMARY OF THE INVENTION

The present invention is a thermoplastic composition consisting essentially of an amorphous polyamide matrix resin and a blend of ionomer and copolymer particles dispersed in the polyamide matrix resin. The polyamide must be of high molecular weight and have an apparent melt viscosity of 3000 poise or more, when measured on a sample that contains no more than 0.15% by weight water, the measurement being made at 280° C. and at a shear ratio of about 100 sec$^{-1}$. The amorphous polyamide must be present in the composition in the amount of about 75% to 85% by weight of the composition. The blend of ionomer and copolymer particles that are dispersed (substantially uniformly throughout the amorphous polyamide) have a particle size such that when the small angle X-ray procedure described herein is applied to a sample of the polymer a particle diameter less than about 360 nm is obtained. The implications of the procedure are that this represents a log-normal distribution where one-half the mass of the particles have a diameter less than about 360 nm. The copolymer in the copolymer particles has a Mooney viscosity of between about 40 and about 66. The composition of the copolymer particles is either (a) 63 to 73% by weight ethylene, 24 to 30% by weight propylene, 3.0 to 6.5% by weight hexadiene, and 0 to 0.5% by weight norbornadiene containing succinic anhydride groups grafted thereto in the amount of 0.25 to 2.25% by weight of the copolymer, or (b) mixtures of at least 35 weight percent (a) and up to 65 weight percent of the copolymers of (a) which do not have succinic anhydride groups grafted thereto. The copolymer is present in the composition in the amount of from 4 to 20% by weight of the composition. The ionomers useful in the present invention are terpolymers containing from 40 to 93 wt. % ethylene, from 5 to 60 wt. % of an acrylate of the formula

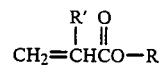

wherein —R is an alkyl group containing 2 to 10 carbon atoms, —R' is —H or —CH$_3$ and from 2 to 20 wt. % acrylic acid or methacrylic acid. The preferred ionomers contain from 70 to 85 wt. % ethylene, 10 to 20 wt. % of the above defined acrylate and 5 to 15 wt. % acrylic acid or methacrylic acid. The ionomer particles are present in the amount of from 5 to 21% by weight of the composition. The copolymer and ionomer particles in some of the compositions of the invention are present in amounts such that their weight plus the weight of the amorphous polyamide polymer combine to make 100% of the thermoplastic components of the compositions of the invention. The compositions of the invention may contain various fillers, reinforcing ingredients such as glass fibers, pigments, stabilizers, mold release agents, antistatic agents and the like all of which are known to those skilled in the art.

DETAILED DESCRIPTION

The thermoplastic amorphous polyamides are obtained from at least one aromatic dicarboxylic acid containing 8–18 carbon atoms and at least one diamine selected from the class consisting of (i) 4–12 carbon normal aliphatic straight-chained diamine, and (ii) 8–20 carbon cycloaliphatic diamines containing at least one cycloaliphatic ring.

Preferred diacids are isophthalic and terephthalic acids. Especially preferred are mixtures containing 60 to 70 mole % isophthalic acid and 40 to 30 mole % terephthalic acid.

Preferred diamines are hexamethylenediamine and bis(p-aminocyclohexyl)methane (PACM, hereinafter). PACM is available as a mixture of three stereoisomers—cis, cis; cis, trans; and trans, trans. Any isomer mixture can be used. Especially preferred are mixtures containing up to 10 mole % PACM isomers and 90 to 100 mole % hexamethylenediamine.

Amorphous polyamides prepared from the especially preferred mixtures of diacids and the especially preferred mixtures of diamines have glass transition temperatures above 120° C.

Amorphous polyamides will generally have no distinct melting point and a heat of fusion of less than 1 cal/gram. The heat of fusion is conveniently determined by use of a differential scanning calorimeter (DSC). A suitable calorimeter is The Du Pont Company's 990 thermal analyzer, Part No. 990000 with cell base II, Part No. 990315, and DSC cell, Part No. 900600. With this instrument, heat of fusion can be measured at a heating rate of 20° C. per minute. The sample is alternately heated to a temperature above the anticipated melting point and cooled rapidly by cooling the sample jacket with liquid nitrogen. The heat of fusion is determined on any heating cycle after the first and should be a constant value, within experimental error.

The apparent melt viscosity of the polyamides at 280° C. was determined by standard techniques with a capillary rheometer (typically with 0.0205 inch orifice diameter, 14.68/1 L/D ratio, and 0.3747 inch piston diameter).

The toughened products claimed in this patent may be obtained from amorphous polyamides with an apparent melt viscosity of 3000 poise or more at 280° C. and a shear rate of 100 sec$^{-1}$ when the polyamides contain 0.15% or less water.

The toughened products of this invention may be obtained from amorphous polyamides with quite high melt viscosity, for example, a melt viscosity of 20,000 poise at 280° C., 100 sec$^{-1}$ shear rate, and 0.05% water. The upper limit of the polyamide melt viscosity is dictated by the ability of the final processing equipment to fabricate articles from high viscosity melts. Those skilled in the art will recognize that materials with comparatively high melt viscosity are desirable in extrusion and blow molding applications while products with lower melt viscosities might be desirable for the injection molding of complicated parts.

The copolymers present in the dispersed particles in the composition of the present invention are either (a) copolymers containing 63 to 73% by weight ethylene, 24 to 30% by weight propylene, 3.0 to 6.5% by weight hexadiene, and 0 to 0.5% by weight norbornadiene having a Mooney viscosity of 40 to 60, and grafted with succinic anhydride groups so that the copolymer contains 1.5 to 2.0% by weight succinic anhydride groups, or (b) mixtures of (a) with ungrafted copolymers of (a), such mixtures containing at least about 35% by weight of (a). Processes for the preparation of such grafted copolymers are known in the art. A suitable process is disclosed in Caywood, U.S. Pat. No. 3,884,882.

The ionomers useful in the present invention are terpolymers containing from 40 to 90 wt. % ethylene, from 8 to 60 wt. % of an acrylate of the formula

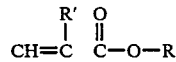

wherein —R is an alkyl group containing 2 to 10 carbon atoms, —R' is —H or —CH$_3$ and from 2 to 20 wt. % acrylic acid or methacrylic acid. The acid groups are from 0 to 100% neutralized with metal ions. (As used herein the term "ionomer" includes the unneutralized acid copolymer.) The preferred metal ions are Zn$^{++}$, Mg$^{++}$, Al$^{+++}$, Ca$^{++}$, K$^+$, Na$^+$ and Li$^+$. Especially preferred is Zn$^{++}$ or Zn$^{++}$ containing up to 50% based on Zn$^{++}$ of Na+. The base terpolymer prior to neutralization with metal ions should have a melt index of 1.0 to 100 g/10 min. as determined by ASTM-D-1238-52T. The ionomers are prepared as described in Rees U.S. Pat. No. 3,264,272. The ionomer particles generally will comprise from 5 to 21% by weight of the composition.

The compositions of this invention may be prepared by mixing preweighed, blended quantities of the amorphous polyamides, the ionomer and the copolymers (tougheners) in the molten state under high shear. Such mixing can be accomplished in commercially available equipment such as a 53 mm twin-screw extruder manufactured by Werner & Pfleiderer Corporation. A satisfactory screw design for an 1860 mm long screw includes mixing elements 750 mm and 1390 mm from the feed end of the screw. Barrel heaters may be set at 260°-275° C. A vacuum port may be used near the die. Screw speeds of 200-250 rpm and extrusion rates of 120-230 pph afford the compositions of this invention with melt temperatures of 310° to 340° C. measured on the molten strand exiting the die. The strands are quenched in water and pelletized. The pellets are dried to a moisture content of 0.15% by weight or less prior to final processing (e.g., injection molding, blow molding, extrusion).

The copolymer and ionomer particles in the compositions of this invention must have a particle size such that when the small angle x-ray procedure described herein is applied to a sample of the polymer a particle diameter less than about 360 nm is obtained. The implications of the procedure are that this represents a log-normal distribution where one-half the mass of the particles have a diameter less than about 360 nm. The particle size distribution in the compositions of the invention is affected by the following factors: the viscosity of the polyamide, the viscosity of the copolymer, the amount of shear applied in mixing the polyamide and the copolymer, and the mixing temperature. Thus, by using a high viscosity polyamide, low viscosity copolymer and ionomer coupled with a large amount of shear during mixing and a low mixing temperature, the desired particle size distribution can be readily achieved.

The concentrations for the ingredients in toughened amorphous polyamides are from 4-20 weight % copolymer 5-21 weight % ionomer (tougheners) and 85-75 weight % amorphous polyamide. Lower concentrations of the copolymer and ionomer (tougheners) afford products with inadequate low temperature toughness. Higher loadings of copolymer and ionomer (toughener) give products with inadequate tensile strength and stiffness for most uses.

Especially preferred concentrations of the ingredients in the toughened products are 8-12 weight % copolymer 6-12 weight % ionomer (tougheners) and 85-78 weight % amorphous polyamide.

The particle size is determined by small-angle x-ray scattering, according to the following technique: The small-angle x-ray scattering (SAXS) data should be acquired on a high-resolution instrument such as the one originally designed by Bonse and Hart *Zeit. fur Physik*, 189, 151 (1966), and subsequently manufactured commercially by Advanced Metals Research Corporation, Burlington, Mass., as the AMR Model 6-220 X-Ray Low Angle Scattering Goniometer. A suitable sample of amorphous polyamide containing dispersed copolymer particles consists of a molding (generally an injection-molded tensile or flex bar) of such thickness as to transmit about 1/e (1/2.71828 or 0.368) of a CuKα (wavelength=0.1542 nm) x-ray beam. This is the optimum thickness for transmission data (data acquired when the x-ray beam passes through the thickness of the sample along the surface normal), and is generally of the order of 80 mils (0.08 inches or about 2 mm) for a typical sample. A typical molding is usually too thick (⅛ inch or greater) but can be thinned by sawing or milling.

Scattered x-ray intensity data are acquired in the range from 8 to 600 seconds of arc (2-theta). The AMR instrument is calibrated in seconds; this corresponds to 0.002° to 0.16° or 4×10$^{-5}$ to 3×10$^{-3}$ radians. Appropriate step sizes range upwards from 2 seconds of arc as the scattering angle increases; 20 points each at stepsizes of 2, 4, 8, and 16 seconds will cover the angular range in 81 points. These are "slit-smeared" results, and, after smoothing and subtraction of instrumental background, should be "desmeared" before interpretation. For this work, the data are desmeared by the method of Schmidt and Hight, *Acta Cryst.*, 13,480 (1960); P. W. Schmidt, *Acta Cryst.*, 19,938 (1965) to cover the range from 0.005° to 0.07° 2-theta. (The experimental angular range from 0.07° to 0.16° of the observed data is required only to desmear the retained results below 0.07°). The desmeared intensity results can be represented as I(h), where $(h = 4\pi \sin \theta)/\lambda = \times 2\theta$. Here, $\theta = (2\theta)/2$ and $\sin \theta) = \theta$ in radians at these small angles) and $\lambda$ = the wavelength of CUK$\alpha$ radiation. These intensity results are converted to the "Invariant" argument, $h^2 I(h)$, by multiplying each desmeared intensity by the square of the angle of observation for that point.

A plot of the invariant argument will be characterized by having a maximum at an angle below 0.04° 2-theta if the dispersed particles causing the scattering have diameters of the order of hundreds of nanometers. If the particle-size distribution is narrow (nearly monodisperse), the particle diameter is inversely proportional to the position of this maximum: diameter = $4.87/2\theta$°$_{max}$ nm. If there is finite breadth to the distribution, the peak position will be shifted to lower angles and the breadth of the distribution must be taken into account. For the results cited here, the observed invariant-argument curves were matched to calculated curves derived assuming a model of a log-normal particle-size distribution. For typical distributions, the most probable particle size is of the order of ⅔ to ¾ that calculated on the basis of the peak position of the invariant argument alone.

In order to characterize a particle-size distribution in the manner employed here, two measurements are made on the invariant-argument curve. The angular position (2-theta), $h_m$, of the maximum is determined and the angular position of the "half-height" $h_\lambda$, is determined. The half-height is that point on the invariant-argument curve which has an ordinate one-half that of the maximum and is on the high-angle side of the maximum. Given a log-normal model, the breadth of the distribution, expressed in relative terms, is a function only of the ratio, $R_h$, of these two angles: $R_h = h_h/h_m$. ($R_h$ should have a value greater than about 1.57. If it is significantly less than this, the position of the maximum of the curve has probably been displaced to higher angles by interparticle interference arising from close, regular packing of the particles.)

A log-normal distribution can be characterized by $R_S$, the ratio of the size at one-sigma of the distribution to the size at the center. For this work, an expression for $R_S$ was determined from $R_h$, by a third order polynomial regression fit to computer-generated data. This equation is:
$R_S = 1.19056 + 1.84535R_h - 0.33524R_h^2 + 0.030186R_h^3$
(Note that when $R_h = 1.5728 +$, $R_s = 1.00$ and the distribution is monodisperse. An $R_s$ of less than 1.0 has no physical meaning.)

For each distribution ratio, $R_S$, there is a factor, F, which can be used to correct the apparent size derived from the position of the invariant maximum corresponding to a monodisperse "distribution". Again, a third order polynomial fit was determined from a computer-generated model:
$F = 1.48725 - 0.42839R_S - 0.062415R_S^2 + 0.022482R_S^3$.

The scattering curve from monodisperse spherical particles can be approximated at a very low angles by $I(h) = K \exp(-h^2 R_o^2)/3$. (See A. Guinier & G. Fournet, *Small-Angle Scattering of X-Rays*, John Wiley & Sons, Inc., New York (1955) page 25), where $R_o$ is the radius of gyration. The invariant argument is then k $h^2$ exp $(-h^2R_o^2)/3$. From the differentiation of this expression, the condition for the maximum, $h_m$, is:

$$h_m^2 R_o^2/3 = 1 \text{ or } R_o = \sqrt{3/h_m}.$$

Substituting for $h_m = (2\pi \cdot 2\theta_m)/\lambda$, $$R = \sqrt{3}\lambda/2\pi 2\theta_m$$

where $\lambda$(CuK$\alpha$) = 0.15418 nm, $R_o$ = 0.042502/2$\theta_{max}$ if $2\theta$ is in radians, $R_o$ = 2.4352/2$\theta_{max}$ if $2\theta$ is in degrees. For the approximation used in this work, the exponential (Gaussian) fit does not extend to angles as high as represented by the maximum of the invariant argument, and a better approximation is given by: $R_o = 2.182/2$-$\theta_{max}$ where $2\theta$ is in degrees. Since the diameter of a sphere, D, as a function of the radius of gyration, $R_o$, is:

$$D = 2\sqrt{5/3} R_o,$$

then $D_m(nm) = 5.6339/2\theta_{max}(deg)$ $D_m$ is the diameter of a particle in a monodisperse "distribution", where all the particles are the same size. When there is a finite distribution of sizes modeled as described above, then the characteristic diameter, $D_c$, is derived from $D_m$ as: $D_c = F^*D_m$.

In the compounds of the present invention the characteristic diameter, $D_c$, is no greater than about 360 nm.

The composition of the invention may be fabricated into high impact parts such as automobile body parts, for example bumpers, fender extensions and the like by injection molding, blow molding, extrusion and other similar techniques.

The composition of the invention include blends of two or more different amorphous polyamides or blends of crystalline polyamide and amorphous polyamide with the tougheners disclosed.

In the Examples which follow yield strength and elongation at break were determined according to ASTM D-638. Flexural modulus was determined (¼-inch specimens) according to ASTM D-790. Notched Izod impact (⅛-inch specimens) was determined according to ASTM D-256. The type of specimen break is noted in the examples and conforms to definitions in ASTM D-256, namely:

C = complete break—wherein the specimen separates into two or more pieces

P = partial break—an incomplete break that is not a hinge break but has fractured at least 90 percent of the distance between the vertex of the notch and the opposite side N = non-break—an incomplete break where the fracture extends less than 90 percent of the distance between the vertex of the notch and the opposite side M = mixed breaks—some of the samples have complete breaks and some of the samples have partial breaks.

The amorphous nylons containing tougheners were tested dry-as-molded (DAM in Table I).

EXAMPLES 1-14

The polyamide used in the Examples 1-6 reported in Table 1, contains 66.8% by weight of polyamide units derived from hexamethylenediaminediamine isophthalamide, 28.6% by weight of polyamide units derived from hexamethylene diamine terephthalamide, 3.2% by weight polyamide units of polyamide derived from bis(para-aminocyclohexyl)methane isophthalamide, and 1.4% by weight polyamide units derived from bis(para-aminocyclohexyl)methane terephthalamide.

The polyamide used in Examples 7-14 is a copolymer of isophthalic acid, terephthalic acid and hexamethylene diamine wherein the isophthalic acid and terephthalic acid are present in a weight/weight ratio of 65/35. In addition to the polyamide and the amounts of ionomer and copolymer reported in Table I these compositions contain minor amounts of zinc stearate and Irganox® 1098 a heat stabilizer.

Copolymer 1 used in the examples is a copolymer of propylene 27±1.5% by weight, hexadiene 3.6-4.4% by weight, and norbornadiene 0.2% by weight and the remainder ethylene, with a Mooney viscosity of 48 by ASTM D-1646 ML 2+10 at 121° C. grafted with fumaric acid to contain 1.5 to 2.0% by weight succinic anhydride. Copolymer 2 is copolymer 1 without the succinic anhydride.

The ionomer used in Examples 1-9, 13 and 14 contained 80 wt. % units derived from ethylene, 10 wt. % units derived from isobutylacrylate and 10 wt. % units derived from methacrylic acid. The ionomer's acid groups were 72% neutralized using zinc metal. The ionomer had a melt index of 35 g/10 min. before neutralization and ca. 1 after neutralization.

The ionomer used in Example 12 contained 23 wt. % units derived from n-butyl acrylate, 8.6 wt. % units derived from methacrylic acid, and 70.4 wt. % units derived from ethylene. The ionomer's acid groups were 75-80% neutralized using zinc metal. The ionomer had a melt index of 2299/10 min. before neutralization and 0.8 g/10 min. after neutralization.

Examples 10 and 11 are controls showing the poorer impact resistance when only the elastomer rather than a combination of elastomer and ionomer is used in the compostion.

All of the composition of Examples 1-14 were prepared under generally similar conditions within the scope outlined above. Table 2 sets forth the particular extrusion conditions for Examples 1, 2, 3, 7 and 8.

TABLE I

| Example | 1 | 2 | 3 | 4 | 5 | 6 |
|---|---|---|---|---|---|---|
| Ionomer % | 7.6 | 9.7 | 11.8 | 3.8 | 7.6 | 11.8 |
| Copolymer 1% | 8.4 | 6.3 | 4.2 | 8.4 | 8.4 | 4.2 |
| Copolymer 2% | | | | 3.8 | | |
| Tensile Strength, psi, DAM | 10100 | 11400 | 10600 | | | |
| Elongation, %, DAM | 237 | 250 | 250 | | | |
| Flex. Modulus, kpsi, DAM | 311 | 315 | 328 | | | |
| Notched Izod, ft-lb/in, 23° C.,¼" bar | 23.6N[1] | 26.2N | 26.7N | 18.4N | 20.9N | 24.4N |
| Notched Izod, ft-lb/in, 0° C.,¼" bar | 19.4N | 19.4N | 17.9P | 15.0P | 15.8P | 7.3C |
| Notched Izod, ft-lb/in, −10° C.,¼" bar | 16.3P | 7.6C | 6.3C | | | |
| Notched Izod, ft-lb/in, −20° C.,¼" bar | 7.2C | 6.3C | .5.3C | | | |
| Rockwell Hardness, DAM | 114 | 116 | 117 | | | |
| Mold Shrinkage, %, ⅛"/¼" | 0.5/0.9 | 0.7/1.0 | 0.5/0.8 | | | |
| Specific Gravity | 1.12 | 1.13 | 1.13 | | | |
| Melt Flow Rate, g/10 min, 280° C. | 1.9 | 2.8 | 3.1 | | | |
| Toughener Particle size nm | 312 | 290 | 304 | 231 | 197 | 200 |

| Example | 7 | 8 | 9 |
|---|---|---|---|
| Ionomer % | 10 | 10 | 10 |
| Copolymer 1% | 10 | 12 | 10 |
| Copolymer 2% | | | |
| Tensile Strength, psi, DAM | 8600 | 8410 | 8270 |
| Elongation, %, DAM | 40 | 126 | 122 |
| Flex. Modulus, kpsi, DAM | 250 | 240 | 240 |
| Notched Izod, ft-lb/in, 23° C.,¼" bar | 23.2P | 23.1P | 24.1P |
| Notched Izod, ft-lb/in, 0° C.,¼" bar | 20.8P | 20.4P | 22.2P |
| Notched Izod, ft-lb/in, −10° C.,¼" bar | 19.2P | 20.2P | 20.2P |
| Notched Izod, ft-lb/in, −20° C.,¼" bar | 15.0P | 17.2P | 13.1M |
| Rockwell Hardness, DAM | — | — | — |
| Mold Shrinkage, %, ⅛"/¼" | — | — | — |
| Specific Gravity | 1.113 | 1.1108 | 1.109 |
| Melt Flow Rate, g/10 min, 280° C. | | | |
| Toughener Particle size | 288 | 236 | 236 |

| Example | 10 | 11 | 12 |
|---|---|---|---|
| Ionomer % | | | 10 |
| Copolymer 1% | 25 | 10 | 12 |
| Copolymer 2% | | 12 | |
| Tensile Strength, psi, DAM | 7780 | 8120 | 8350 |
| Elongation, %, DAM | 45 | 154 | 131 |
| Flex. Modulus, kpsi, DAM | 210 | 220 | 240 |

TABLE I-continued

| | | | |
|---|---|---|---|
| Notched Izod, ft-lb/in, 23° C., ¼" bar | 16.0P | 18.4P | 21.5P |
| Notched Izod, ft-lb/in, 0° C., ¼" bar | 16.3P | 17.4P | 20.9P |
| Notched Izod, ft-lb/in, −10° C., ¼" bar | 15.8P | 17.2P | 19.6P |
| Notched Izod, ft-lb/in, −20° C., ¼" bar | 14.7P | 14.7P | 17.1P |
| Rockwell Hardness, DAM | — | — | — |
| Mold Shrinkage, %, ⅛"/¼" | — | — | — |
| Specific Gravity | | | |
| Melt Flow Rate, g/10 min, 280° C. | | | |
| Toughener Particle size | | | |

| Example | 13 | 14 |
|---|---|---|
| Ionomer % | 10 | 12 |
| Copolymer 1% | 12 | 10 |
| Copolymer 2% | | |
| Tensile Strength, psi, DAM | 8410 | 8270 |
| Elongation, %, DAM | 126 | 122 |
| Flex. Modulus, kpsi, DAM | 240 | 240 |
| Notched Izod, ft-lb/in, 23° C., ¼" bar | 23.1P | 24.1P |
| Notched Izod, ft-lb/in, 0° C., ¼" bar | 20.4P | 22.2P |
| Notched Izod, ft-lb/in, −10° C., ¼" bar | 20.2P | 20.7P |
| Notched Izod, ft-lb/in, −20° C., ¼" bar | 17.8P | 13.8P |
| Rockwell Hardness, DAM | — | — |
| Mold Shrinkage, %, ⅛"/¼" | — | — |
| Specific Gravity | | |
| Melt Flow Rate, g/10 min, 280° C. | | |
| Toughener Particle size | | |

Notes:
(1) N = no break;
P = partial break;
C = complete (brittle) break;
M = mixed break

TABLE 2
EXTRUSION CONDITIONS

| Example Number | 1 | 2 | 3 | 7 | 8 |
|---|---|---|---|---|---|
| Screw Speed, rpm | 235 | 245 | 245 | 225 | 230 |
| Melt Temp., °C. | 321 | — | 322 | 343 | 339 |
| Extruder Vacuum, inches Hg | 25 | 25 | 25 | 12.5 | 13 |
| Melt Pressure at Die, psi | | | | 800 | 860 |
| Extrusion Rate, pph | 206 | — | 223 | 248 | 252 |

I claim:

1. A thermoplastic composition having high impact resistance, said composition consisting essentially of a polyamide matrix resin comprising an amorphous polyamide, said polyamide having an apparent melt viscosity of 3000 poise or more, said polyamide being present in the composition in the amount of about 75 to 85% by weight of the composition, and at least 15% by weight of the composition toughener particles that are dispersed in said polyamide matrix resin said toughener particles having a particle size, as determined by small angle x-ray scattering, of less than about 360 nm, said toughener particles being formed from 4 to 20 weight percent, based on the thermoplastic composition, of a copolymer of the class consisting of (a) copolymer having a Mooney viscosity of 40 to 60, containing 63 to 73 weight percent ethylene, 24 to 30 weight percent propylene, 3.0 to 6.5% by weight hexadiene, and 0 to 0.536% by weight norbornadiene, grafted with succinic anhydride groups in the amount of 0.25 to 2.25 weight percent of the copolymer; or (b) mixtures of (a) with the ungrafted copolymers of (a), such mixtures containing at least about 35% by weight of (a); with (c) from 5 to 21 weight percent, based on the thermoplastic composition, of an ionomer containing from 40 to 93 weight percent ethylene, from 5 to 60 weight percent an acrylate of the formula

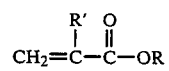

wherein —R is an alkyl group containing 2 to 8 carbon atoms, —R' is —H or —CH₃, and from 2 to 20 weight percent acrylic acid or methacrylic acid wherein from 0 to 100 percent of the acid groups are neutralized with metal ions.

2. The composition of claim 1 in which the metal ions used to neturalize the ionomer are selected from the class consisting of $Zn^{++}$, $Mg^{++}$, $Al^{+++}$, $Ca^{++}$, $K^+$, $Na^+$, and $Li^+$.

3. The composition of claim 2 in which the polyamide is an amorphous polyamide which is the reaction product of at least one aromatic dicarboxylic acid containing 8 to 18 carbon atoms and at least one diamine selected from the class consisting of 4–12 carbon normal aliphatic straight chain diamines, and 8 to 20 carbon cycloaliphatic diamines containing at least one cycloaliphatic ring.

4. The composition of claim 3 in which the polyamide is the reaction product of isophthalic acid, terephthalic acid, and hexamethylenediamine.

5. The composition of claim 3 in which the polyamide is the reaction product of isophthalic acid, terephthalic acid, hexamethylenediamine and bis(p-aminocyclohexyl)methane.

6. The composition of claim 5 in which the reaction product contains 2 to 10 mole percent units obtained by the reaction of bis(p-aminocyclohexyl)methane and 90 to 98 mole percent units obtained by the reaction of hexamethylenediamine.

7. The composition of claim 6 in which the ionomer contains from 70 to 85 weight percent ethylene, from 10 to 20 weight acrylate and from 5 to 15 weight percent acid.

* * * * *